US008627889B2

(12) United States Patent
Williamson et al.

(10) Patent No.: US 8,627,889 B2
(45) Date of Patent: Jan. 14, 2014

(54) DRILLING AND FRACTURING FLUID

(75) Inventors: Don Williamson, Katy, TX (US); Philip F. Sullivan, Bellaire, TX (US); Marie Noelle Dessinges, Paris (FR)

(73) Assignee: Schlumberger Technology Corporation, Sugar Land, TX (US)

( * ) Notice: Subject to any disclaimer, the term of this patent is extended or adjusted under 35 U.S.C. 154(b) by 435 days.

(21) Appl. No.: 11/862,781

(22) Filed: Sep. 27, 2007

(65) Prior Publication Data
US 2009/0084554 A1 Apr. 2, 2009

(51) Int. Cl.
E21B 43/26 (2006.01)
E21B 7/00 (2006.01)

(52) U.S. Cl.
USPC .............................. 166/308.1; 175/64; 175/65

(58) Field of Classification Search
None
See application file for complete search history.

(56) References Cited

U.S. PATENT DOCUMENTS

| | | | | |
|---|---|---|---|---|
| 3,271,307 | A | * | 9/1966 | Dickson et al. ............ 166/280.1 |
| 4,527,639 | A | * | 7/1985 | Dickinson et al. .............. 175/61 |
| 5,207,282 | A | | 5/1993 | Fuh et al. |
| 6,207,620 | B1 | * | 3/2001 | Gonzalez et al. ............. 507/277 |
| 6,342,467 | B1 | | 1/2002 | Chang et al. |
| 6,419,019 | B1 | | 7/2002 | Palmer et al. |
| 6,772,847 | B2 | * | 8/2004 | Rae et al. ........................ 175/62 |
| 7,028,775 | B2 | | 4/2006 | Fu et al. |
| 7,108,066 | B2 | | 9/2006 | Jamison |
| 7,114,567 | B2 | | 10/2006 | Chan et al. |
| 7,165,613 | B2 | | 1/2007 | Chan et al. |
| 7,265,079 | B2 | | 9/2007 | Willberg et al. |
| 7,284,611 | B2 | * | 10/2007 | Reddy et al. ................... 166/295 |
| 7,303,012 | B2 | | 12/2007 | Chan et al. |
| 7,325,611 | B2 | | 2/2008 | Santra et al. |
| 7,341,106 | B2 | | 3/2008 | Reddy et al. |
| 7,350,575 | B1 | | 4/2008 | Lewis et al. |
| 7,503,404 | B2 | * | 3/2009 | McDaniel et al. ............... 175/57 |
| 2003/0164252 | A1 | | 9/2003 | Rae et al. |
| 2004/0106525 | A1 | * | 6/2004 | Willberg et al. .............. 507/200 |
| 2005/0230107 | A1 | * | 10/2005 | McDaniel et al. ............ 166/249 |
| 2008/0105428 | A1 | | 5/2008 | Santra et al. |

FOREIGN PATENT DOCUMENTS

| | | |
|---|---|---|
| EP | 1444416 | 8/2004 |
| RU | 2200056 C2 | 3/2003 |
| RU | 2236286 C1 | 9/2004 |
| WO | 2006003637 | 1/2006 |

OTHER PUBLICATIONS

Young, "Nuts", Encyclopedia of Chemical Technology, Third Edition, vol. 16, 1981, pp. 248-273.
Official Action mailed Aug. 2, 2013 for Mexican Patent Application No. MX/a/2010/002941, Agent's English translation provided, 8 pages.

* cited by examiner

*Primary Examiner* — Angela M DiTrani
(74) *Attorney, Agent, or Firm* — Maithieu Vandermolen; Daryl Wrigth; Tim Curington

(57) ABSTRACT

A method of fracturing a subterranean formation while drilling a well includes the steps of preparing a fluid useful for drilling a wellbore into the formation; drilling the wellbore into the formation with the fluid; acidizing the fluid such that the acid soluble additive is degraded; and fracturing the formation with the fluid in the wellbore to create a channel in the formation.

20 Claims, 1 Drawing Sheet

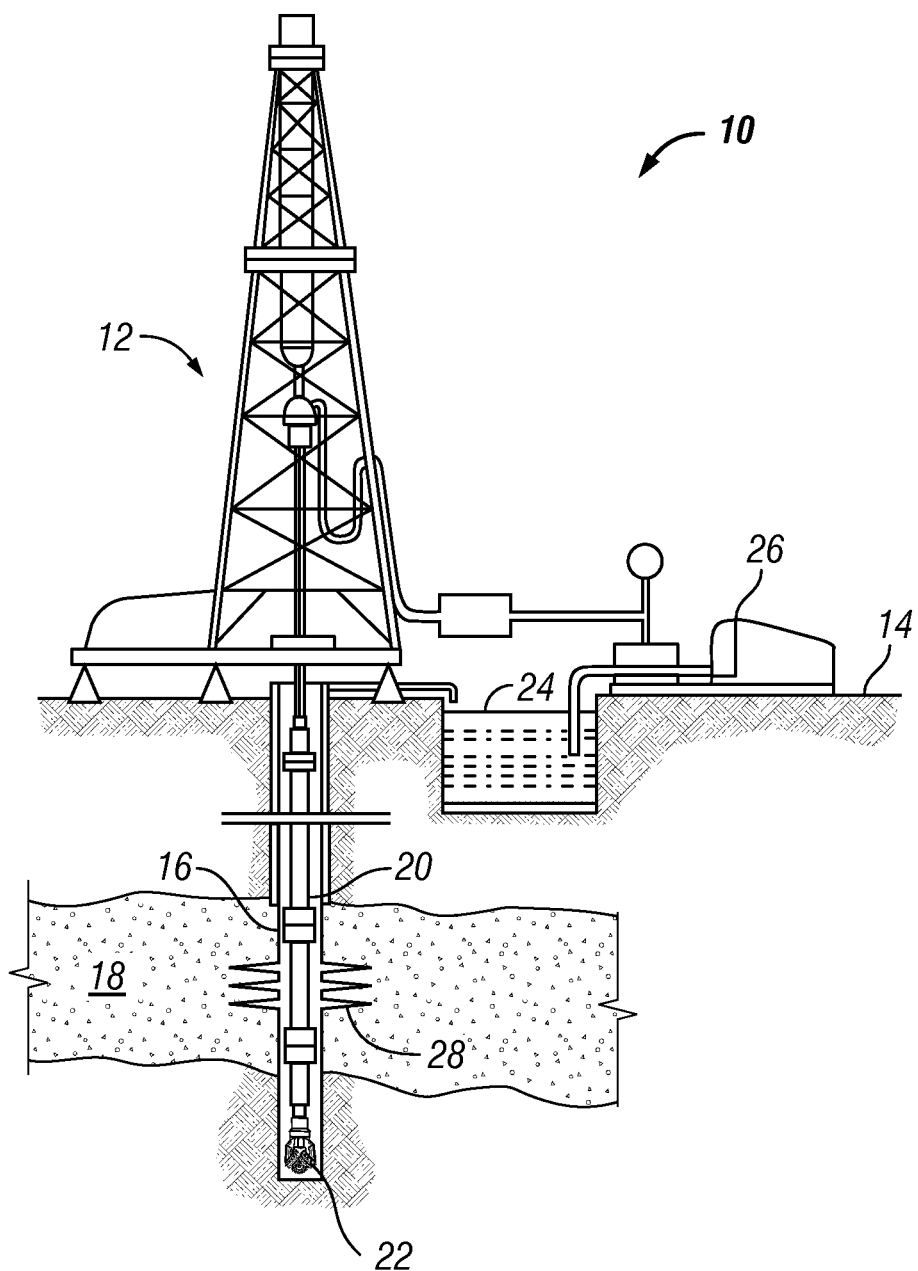

DRILLING AND FRACTURING FLUID

TECHNICAL FIELD

The present invention relates in general to wellbore operations and in particular to fluids for drilling and stimulating or fracturing a reservoir formation.

BACKGROUND

The statements in this section merely provide background information related to the present disclosure and may not constitute prior art.

In general, distinctly different fluid systems are required to perform wellbore drilling operations and the stimulation operations such as reservoir fracturing. Drilling fluids become laden with drilled-rock particles and additives. Fracturing fluids are designed to be free of undesirable solids and additives that might reduce permeability and/or porosity of the stimulated formation and hydraulically generated fractures. It is a desired to provide a fluid that may be utilized as a drilling fluid and as a stimulation or fracturing fluid.

SUMMARY

In view of the foregoing and other considerations, the present invention relates to performing more than one wellbore operation without displacement of the working fluid to a secondary fluid system.

Accordingly, methods for using a single fluid to drill and fracture a well are provided. One method of fracturing a subterranean formation while drilling a well includes the steps of drilling a wellbore into a reservoir formation with a fluid, acidizing the fluid, and pressurizing the fluid to create a fracture in the subterranean formation.

Another method of fracturing a subterranean formation while drilling a well includes the steps of preparing a fluid with acid soluble additive(s) for drilling a wellbore into the formation; drilling the wellbore into the formation with the fluid; acidizing the fluid such that the acid soluble additive(s) will be degraded; and fracturing the formation with the fluid in the wellbore to create a channel in the formation.

Another method of fracturing a subterranean formation while drilling a wellbore includes the steps of preparing a dual-use fluid including an oleaginous fluid, a non-oleaginous fluid, and an amine surfactant; drilling a wellbore into a formation utilizing the dual-use fluid; adding a solid acid-precursor in the dual-use fluid; fracturing the formation utilizing the dual-use fluid in the wellbore; and generating acid in the dual-use fluid after the step of hydraulically fracturing the wellbore thereby converting the dual-use fluid from a water-in-oil emulsion to an oil-in-water emulsion and dissolving acid soluble components. For this or any other embodiment of the invention, acid soluble additives may be optionally, or may not be added to the dual-use fluid before drilling the wellbore.

Yet another method of method of fracturing a subterranean formation while drilling a well includes preparing a dual use fluid that is useful for drilling a wellbore into the formation; drilling a wellbore into the reservoir formation with the dual-use fluid; then, adding a solid-acid precursor to the fluid followed by fracturing the formation utilizing the dual-use fluid in the wellbore. Then, acid is generated from the solid acid precursor acid in the dual-use fluid after hydraulically fracturing the wellbore, the acid thereby dissolving drilling additives in response to generating acid.

Another method of fracturing a subterranean formation while drilling a well includes preparing a dual use fluid comprising a solid-acid precursor, then drilling a wellbore into a reservoir formation utilizing the dual-use fluid. The formation is then fractured utilizing the dual-use fluid, and acid generated in the dual-use fluid after the step of hydraulically fracturing the wellbore to dissolve drilling additives.

The methods and compositions of the invention may be used in any suitable downhole environment and formation geology, including those where the reservoir formation is predominately one of a carbonate formation, sandstone formation, or shale formation.

The foregoing has outlined some of the features and technical advantages of the present invention in order that the detailed description of the invention that follows may be better understood. Additional features and advantages of the invention will be described hereinafter which form the subject of the claims of the invention.

BRIEF DESCRIPTION OF THE DRAWINGS

The foregoing and other features and aspects of the present invention will be best understood with reference to the following detailed description of a specific embodiment of the invention, when read in conjunction with the accompanying drawings, wherein:

FIG. 1 is a schematic illustration of an example of a dual-purpose fluid system.

DETAILED DESCRIPTION

At the outset, it should be noted that in the development of any such actual embodiment, numerous implementation-specific decisions must be made to achieve the developer's specific goals, such as compliance with system related and business related constraints, which will vary from one implementation to another. Moreover, it will be appreciated that such a development effort might be complex and time consuming but would nevertheless be a routine undertaking for those of ordinary skill in the art having the benefit of this disclosure. The description and examples are presented solely for the purpose of illustrating the preferred embodiments of the invention and should not be construed as a limitation to the scope and applicability of the invention. While the compositions according to the invention are described herein as comprising certain materials, it should be understood that the composition could optionally comprise two or more chemically different materials. In addition, the composition can also comprise some components other than the ones already cited. In the summary of the invention and this detailed description, each numerical value should be read once as modified by the term "about" (unless already expressly so modified), and then read again as not so modified unless otherwise indicated in context. Also, in the summary of the invention and this detailed description, it should be understood that a concentration range listed or described as being useful, suitable, or the like, is intended that any and every concentration within the range, including the end points, is to be considered as having been stated. For example, "a range of from 1 to 10" is to be read as indicating each and every possible number along the continuum between about 1 and about 10. Thus, even if specific data points within the range, or even no data points within the range, are explicitly identified or refer to only a few specific, it is to be understood that inventors appreciate and understand that any and all data points within the range are to be considered to have been specified, and that inventors possession of the entire range and all points within the range.

Refer now to the drawings wherein depicted elements are not necessarily shown to scale and wherein like or similar elements are designated by the same reference numeral through the several views.

As used herein, the terms "up" and "down"; "upper" and "lower"; and other like terms indicating relative positions to a given point or element are utilized to more clearly describe some elements of the embodiments of the invention. Commonly, these terms relate to a reference point as the surface from which drilling operations are initiated as being the top point and the total depth of the well being the lowest point.

FIG. 1 is schematic illustration of a dual-use fluid system of the present invention, generally denoted by the numeral 10, being utilized to drill and fracture a well. A drilling rig 12 is positioned at the surface 14 for drilling a wellbore 16 into one or more subterranean reservoir formations 18. In the described example, formation 18 is a carbonate reservoir formation, however, it is noted that system 10 may be utilized for other formation material.

In the illustration, a pipe string 20 having a drill bit 22 is utilized to drill wellbore 16. Dual-use fluid 24 is in fluid connection with a fluid handling system generally denoted by the numeral 26. Fluid handling system 26 may include numerous elements such as pumps, tanks, pits, mixers, shale shakers and the like.

Dual-use fluid 24 is adapted to be utilized to as a drilling fluid for drilling wellbore 16 and as a fracturing fluid to form fractures or channels 28 in formation 18, for example in a fracturing while drilling operation. Fluid 24 may be a water-based fluid, oil-based fluid, or a reversible phase emulsion fluid. A reversible phase emulsion fluid may be changed between a water-in-oil emulsion, an oil-in-water emulsion, or a simple mixture of water and oil. Dual-use fluid 24 will be described herein with reference to reversible phase fluids and water-based fluids.

Some additives used in some embodiments of the invention may be acid soluble additives, including, but not limited to, weighting agents, fluid loss control material, filter cake control agents, viscosifiers, wetting agents, bridging agents and the like may be added to fluid 24 to adapt it for drilling wellbore 16. Other additives and chemicals that are known to be commonly used in oilfield applications by those skilled in the art, which may or may not be acid soluble, may be used as well, in some embodiments. These include, but are not necessarily limited to, breaker aids, amino acids, oxygen scavengers, alcohols, scale inhibitors, corrosion inhibitors, bactericides, iron control agents, organic solvents, and the like.

For fracturing the subterranean formation, acid is added to fluid 24 to adapt it to use as a fracturing fluid. Desirably fluid 24 is acidized in fracture 28 or proximate to the formation of fracture 28. By acidizing fluid 24 the acid soluble additives are dissolved thus limiting plugging or the formation or the fractures by use of fluid 24 from the drilling step. The acid soluble drill cuttings may also be reduced or eliminated by the acidizing of fluid 24. Additionally, when fluid 24 is a reversible phase fluid, the step of acidizing fluid 24 causes the phase of fluid 24 to be changed.

A proppant may also be added to fluid 24 for maintaining the created channels 28. It is noted that dual-use fluid 24 facilitates both drilling wellbore 16 and fracturing formation 18 with fluid 24 without displacement of dual-use fluid 24 to a secondary fluid system or the use of a different fracturing fluid from the drilling fluid. Proppant particles are substantially insoluble in the fluids of the formation. Proppant particles carried by the treatment fluid remain in the fracture created, thus propping open the fracture when the fracturing pressure is released and the well is put into production. Suitable proppant materials include, but are not limited to, sand, walnut shells, sintered bauxite, glass beads, ceramic materials, naturally occurring materials, or similar materials. Mixtures of proppants can be used as well. If sand is used, it will typically be from about 20 to about 100 U.S. Standard Mesh (approx. 0.84 mm to 0.15 mm) in size. Naturally occurring materials may be underived and/or unprocessed naturally occurring materials, as well as materials based on naturally occurring materials that have been processed and/or derived. Suitable examples of naturally occurring particulate materials for use as proppants include, but are not necessarily limited to: ground or crushed shells of nuts such as walnut, coconut, pecan, almond, ivory nut, brazil nut, etc.; ground or crushed seed shells (including fruit pits) of seeds of fruits such as plum, olive, peach, cherry, apricot, etc.; ground or crushed seed shells of other plants such as maize (e.g., corn cobs or corn kernels), etc.; processed wood materials such as those derived from woods such as oak, hickory, walnut, poplar, mahogany, etc. including such woods that have been processed by grinding, chipping, or other form of particalization, processing, etc. The concentration of proppant in the fluid can be any concentration known in the art, and, as an example, may be in the range of from about 0.05 to about 3 kilograms of proppant added per liter of liquid phase. Also, any of the proppant particles can further be coated with a resin to potentially improve the strength, clustering ability, and flow back properties of the proppant.

When fluid 24 is a reversible phase fluid, it includes an oleaginous fluid, a non-oleaginous fluid and an amine surfactant. The oleaginous fluid may be diesel oil, mineral oil, a synthetic oil and suitable combinations of these and may include at least 5% of a material selected form the group including esters, ethers, acetals, dialkylcarbonates, hydrocarbons and combinations thereof. The non-oleaginous fluid may be an aqueous liquid which may be selected from the group including fresh water, produced water, sea water, brine containing organic and/or inorganic dissolved salts, an aqueous solution containing water-miscible organic compounds, or combinations of these.

Reversible phase fluid 24 may be an invert emulsion, water-in-oil emulsion, for the drilling step of the operation. The invert emulsion fluid may contain a weighting agent, a bridging agent and/or other additives that are acid soluble. The weighting agents and/or bridging agents may be selected from the group including calcium carbonate, dolomite, siderite, barite, celestite, iron oxides, manganese oxides, ulexite, carnalite, and sodium chloride.

Upon completion of the drilling step and in preparation for fracturing formation 18, reversible phase fluid 24 may be converted from an invert emulsion to a direct emulsion or simply a water and oil mixture. In the present example, the invert emulsion is admixed with an acid that is functionally able to protonate the amine surfactant. When sufficient quantities of the acid are utilized, the invert emulsion is converted so that the oleaginous fluid becomes the discontinuous phase and the non-oleaginous fluid becomes the continuous phase. The conversion of the phases may be reversible so that upon addition of a base capable of deprotonating the protonated amine surfactant, a stable invert emulsion in which the oleaginous liquid becomes the continuous phase and the non-oleaginous fluid become the discontinuous phase can be formed.

The acid further prepares dual-use fluid 24 for use in fracturing formation 18 by degrading various additives that were utilized in the drilling step. Additionally, the acid eliminates at least a portion of the cuttings carried by fluid 24, in particular when the formation is carbonate.

Compounds that are suitable for use as an acid include mineral acids and organic acids preferably soluble in water. Mineral acids include hydrochloric acid, sulfuric acid, nitric acid, phosphoric acid, hydrofluoric acid, hydrobromic acid and the like. Organic acids include citric acid, tartaric acid, acetic acid, propionic acid, glycolic acid, lactic acid, halogenated acetic acids, butyric acid, organosulfonic acids, organophosphoric acids, and the like. Compounds that generate acid upon dissolution in water may also be used, for example, acetic anhydride, hydrolyzable esters, hydrolyzable organosulfonic acid derivatives, hydrolyzable organophosphoric acid derivatives, phosphorus trihalide, phosphorous oxyhalide, anhydrous metal halides, sulfur dioxide, nitrogen oxides, carbon dioxide, and similar such compounds. Typically, fatty acids should be avoided or used in small amounts so as to not interfere with the reversibility of the amine surfactant system.

Excellent sources of acid that can be generated downhole when and where it is needed are solid cyclic dimers, or solid polymers, of certain organic acids, that hydrolyze under known and controllable conditions of temperature, time and pH to form the organic acids. One example of a suitable solid acid is the solid cyclic dimer of lactic acid (known as "lactide"), which has a melting point of 95 to 125 degrees Celsius, (depending upon the optical activity). Another is a polymer of lactic acid, (sometimes called a polylactic acid (or "PLA"), or a polylactate, or a polylactide). Another example is the solid cyclic dimer of glycolic acid (known as "glycolide"), which has a melting point of about 86 degrees Celsius. Yet another example is a polymer of glycolic acid (hydroxyacetic acid), also known as polyglycolic acid ("PGA"), or polyglycolide. Another example is a copolymer of lactic acid and glycolic acid. These polymers and copolymers are polyesters.

It has been found that dissolution of the solid acid-precursors may be accelerated by the addition of certain chemical agents. These agents react readily with the solid acid-precursor and cause the removal of a small amount of material from the solid acid-precursor surface. Note that the formation itself can be a solid accelerant. Furthermore, the action of accelerants may be delayed, for example, if the are slowly soluble solids or if they are chemically bound in a liquid chemical that must be hydrolyzed to release the agent. One solid acid-precursor may be an accelerant for another; for example, PGA accelerates the hydrolysis of PLA. The timing and rate of dissolution of the solid acid-precursor is controlled by these techniques.

To accelerate the dissolution of solid acid-precursors, water-insoluble solid acid-soluble or acid-reactive materials, such as but not limited to magnesium hydroxide, magnesium carbonate, dolomite (magnesium calcium carbonate), calcium carbonate, aluminum hydroxide, calcium oxalate, calcium phosphate, aluminum metaphosphate, sodium zinc potassium polyphosphate glass, and sodium calcium magnesium polyphosphate glass, may be mixed with or incorporated into, solid acid-precursors, such as cyclic ester dimers of lactic acid or glycolic acid or homopolymers or copolymers of lactic acid or glycolic acid. These mixtures are added to the fracturing fluid. At least a portion of the solid acid-precursor slowly hydrolyzes at controllable rates to release acids at pre-selected locations and times in fracture 28.

The acids react with and dissolve at least a portion of the acid-reactive materials. This accelerates the dissolution of the solid acid-precursor and generates acid in amounts beyond that which reacts with the solid acid-reactive material(s). The result is that at least a portion of both the solid acid-precursor and the acid-reactive solid material dissolve. Usually most or all of the solid material initially added is no longer present at the end of the treatment. However, it is not necessary either for all of the solid acid-precursor to hydrolyze or for all of the solid acid-reactive material to dissolve. Any solids remaining will beneficially act as proppant. Note that often the additional solid acid-reactive material will not be needed to accelerate the hydrolysis of the solid acid-precursor, because the formation itself will be acid-reactive. However, the solid acid-reactive material may be selected to be more reactive than the formation or may be in more intimate contact with the solid acid-precursor.

The dissolution of solid acid-precursors in acid fracturing may also be accelerated by the addition of certain soluble liquid additives. These accelerants may be acids, bases, or sources of acids or bases. These are particularly valuable at low temperatures (for example below about 135 degrees Celsius), at which the solid acid-precursors hydrolyze slowly, relative to the time an operator would like to put a well on production after a fracturing treatment. Non-limiting examples of such soluble liquid additives that hydrolyze to release organic acids are esters (including cyclic esters), diesters, anhydrides, lactones and amides. A compound of this type, and the proper amount, that hydrolyzes at the appropriate rate for the temperature of the formation and the pH of the fracturing fluid is readily identified for a given treatment by simple laboratory hydrolysis experiments. Other suitable soluble liquid additives are simple bases. (They are termed "liquids" because in practice it would be simpler and safer to add them to the fracturing fluid as aqueous solutions rather than as solids.) Suitable bases are sodium hydroxide, potassium hydroxide, and ammonium hydroxide. Other suitable soluble liquid additives are alkoxides, water-soluble carbonates and bicarbonates, alcohols such as but not limited to methanol and ethanol, alkanol amines and organic amines such monoethanol amine and methyl amine. Other suitable soluble liquid additives are acids, such as but not limited to hydrochloric acid, hydrofluoric acid, ammonium bifluoride, formic acid, acetic acid, lactic acid, glycolic acid, aminopolycarboxylic acids (such as but not limited to hydroxyethyliminodiacetic acid), polyaminopolycarboxylic acids (such as but not limited to hydroxyethylethylenediaminetriacetic acid), salts—including partial salts—of the organic acids (for example, ammonium, potassium or sodium salts), and mixtures of these acids or salts. (Ammonium bifluoride partially hydrolyzes in contact with water to form some HF, and so will be called an acid here.) The organic acids may be used as their salts. When corrosive acid might contact corrodible metal, corrosion inhibitors are added.

Mixtures of one or more solid acid-precursors and one or more solid acid-reactive materials, if they are present, may be purely physical mixtures of separate particles of the separate components. The mixtures may also be manufactured such that one or more solid acid-precursors and one or more solid acid-reactive materials is in each particle; this will be termed a "combined mixture". This may be done, by non-limiting examples, by coating the acid-reactive material with the solid acid-precursor, or by heating a physical mixture until the solid acid-precursor melts, mixing thoroughly, cooling, and comminuting.

The solid acid-precursors or the mixtures of solid acid-precursors and solid acid-reactive materials may be manufactured in various solid shapes, including, but not limited to fibers, beads, films, ribbons and platelets. The solid acid-precursors or the mixtures of solid acid-precursors and solid acid-reactive materials may be coated to slow the hydrolysis. Suitable coatings include polycaprolate (a copolymer of glycolide and epsilon-caprolactone), and calcium stearate, both of which are hydrophobic. Polycaprolate itself slowly hydrolyzes. Generating a hydrophobic layer on the surface of the solid acid-precursors or the mixtures of solid acid-precursors and solid acid-reactive materials by any means delays the hydrolysis. Note that coating here may refer to encapsulation or simply to changing the surface by chemical reaction or by forming or adding a thin film of another material. Another suitable method of delaying the hydrolysis of the solid acid-precursor, and the release of acid, is to suspend the solid acid-precursor, optionally with a hydrophobic coating, in an oil or in the oil phase of an emulsion. The hydrolysis and acid release do not occur until water contacts the solid acid-precursor. Methods used to delay acid generation may be used in conjunction with inclusion of solid acid-reactive material to accelerate acid generation because it may be desirable to delay acid generation but then to have acid generated rapidly.

Examples of methods of fracturing a subterranean formation 18 that is in fluid communication with the surface 14 via a well is now described with reference to FIG. 1. In one example, a wellbore 16 is drilled into a reservoir formation 18 with fluid 24. An acid is added to fluid 24 and fluid 24 is pressurized causing formation 18 to fracture 28. The acid may reverse the phase of fluid 24 as well as degrade additives and/or cuttings in fluid 24.

From the foregoing detailed description of specific embodiments of the invention, it should be apparent that a system and method for drilling a wellbore and fracturing a formation with substantial the same fluid that is novel has been disclosed. Although specific embodiments of the invention have been disclosed herein in some detail, this has been done solely for the purposes of describing various features and aspects of the invention, and is not intended to be limiting with respect to the scope of the invention. It is contemplated that various substitutions, alterations, and/or modifications, including but not limited to those implementation variations which may have been suggested herein, may be made to the disclosed embodiments without departing from the spirit and scope of the invention as defined by the appended claims which follow.

What is claimed is:

1. A method of fracturing a subterranean formation while drilling a well, the method comprising the steps of:
   a. drilling a wellbore into a reservoir formation utilizing a drilling fluid, wherein the fluid comprises an acid soluble material;
   b. acidizing the fluid; and
   c. pressurizing the fluid to create a fracture in the subterranean formation;
   d. adding proppant to the fluid
   wherein the step of acidizing the fluid changes the fluid from a water-in-oil emulsion to an oil-in-water emulsion or simple water and oil solution.

2. The method of claim 1, wherein the step of acidizing the fluid occurs proximate the fracture.

3. The method of claim 1, wherein the step of acidizing the fluid includes the step of degrading additives that are present in the fluid for the step of drilling the wellbore such that the additives that are present in the fluid for the step of drilling do not cause any conductivity loss to the fractures formed by the pressurizing the fluid step that is greater than the conductivity loss that would occur if no acid soluble material were present.

4. The method of claim 1, wherein the step of acidizing the fluid includes adding acid to the fluid in a solid form.

5. The method of claim 1, wherein the fluid is utilized for the drilling step and the fracturing step without displacement of the fluid to a secondary fluid system between the steps.

6. The method of claim 1, wherein the step of acidizing the fluid includes generating acid in the fluid after the drilling step.

7. The method of claim 6, wherein the step of acidizing the fluid includes generating acid in the fluid within a channel.

8. The method of claim 6, wherein the step of acidizing the fluid includes the step of allowing at least a portion of a solid acid-precursor included in the fluid to hydrolyze.

9. A method of fracturing a subterranean formation while drilling a well, the method comprising the steps of:
   a. preparing a drilling fluid comprising an acid soluble additive;
   b. drilling a wellbore into the formation utilizing the fluid;
   c. acidizing the fluid such that the acid soluble additive is degraded; and,
   d. fracturing the formation with the fluid;
   e. adding proppant to the fluid
   wherein the step of acidizing the fluid changes the fluid from a water-in-oil emulsion to an oil-in-water emulsion or simple water and oil solution.

10. The method of claim 9, wherein the step of acidizing the fluid occurs proximate to the fracture.

11. The method of claim 9, wherein the step of acidizing the fluid includes the step of degrading additives that may present in the fluid for the step of drilling the wellbore such that the additives that are present in the fluid for the step of drilling do not cause any conductivity loss to the fractures formed by the pressurizing the fluid step that is greater than the conductivity loss that would occur if no acid soluble material were present.

12. The method of claim 9, wherein the step of acidizing the fluid includes adding acid to the fluid in a solid form.

13. The method of claim 9, wherein the fluid is utilized for the drilling step and the fracturing step without displacement of the fluid to a secondary fluid system between the steps.

14. The method of claim 9, wherein the step of acidizing the fluid includes generating acid in the fluid after the drilling step.

15. The method of claim 9, wherein the step of acidizing the fluid includes generating acid in the fluid within a fracture channel.

16. The method of claim 9, wherein the step of acidizing the fluid includes the step of allowing at least a portion of a solid acid-precursor included in the fluid to hydrolyze.

17. The method of claim 9, wherein acidizing the fluid may dissolve drill cuttings in the fluid.

18. A method of fracturing a subterranean formation while drilling a wellbore, the method comprising the steps of:
   a. preparing a dual-use fluid including an oleaginous fluid, a non-oleaginous fluid, and an amine surfactant;
   b. drilling a wellbore into a formation utilizing the dual-use fluid;
   c. adding a solid acid-precursor in the dual-use fluid;
   d. fracturing the formation utilizing the dual-use fluid in the wellbore;
   e. generating acid in the dual-use fluid after the step of fracturing thereby converting the dual-use fluid from a water-in-oil emulsion to an oil-in-water emulsion; and,
   f. dissolving drilling additives in response to generating acid in the dual-use fluid.

19. A method of fracturing a subterranean formation while drilling a well, the method comprising the steps of:
   a. preparing a dual use fluid useful in drilling a wellbore into the formation;
   b. drilling a wellbore into a reservoir formation utilizing the dual-use fluid;
   c. adding a solid-acid precursor to the fluid;

d. fracturing the formation utilizing the dual-use fluid in the wellbore; and
e. generating acid in the dual-use fluid after the step of fracturing thereby dissolving drilling additives in response to generating acid in the dual-use fluid;
f. adding proppant to the fluid
wherein the step of generating acid changes the fluid from a water-in-oil emulsion to an oil-in-water emulsion or simple water and oil solution.

20. A method of fracturing a subterranean formation while drilling a well, the method comprising the steps of:
   a. preparing a dual use fluid comprising a solid-acid precursor, the fluid useful for drilling a wellbore into the formation;
   b. drilling a wellbore into a reservoir formation utilizing the dual-use fluid;
   c. fracturing the formation utilizing the dual-use fluid in the wellbore; and,
   d. generating acid in the dual-use fluid after the step of fracturing thereby dissolving drilling additives in response to generating acid in the dual-use fluid
   e. adding proppant to the fluid
   wherein the step of generating acid changes the fluid from a water-in-oil emulsion to an oil-in-water emulsion or simple water and oil solution.

* * * * *